July 3, 1956  H. W. TREVASKIS  2,752,942
PRESSURE RELIEF VALVE
Filed Sept. 13, 1952
2 Sheets-Sheet 1
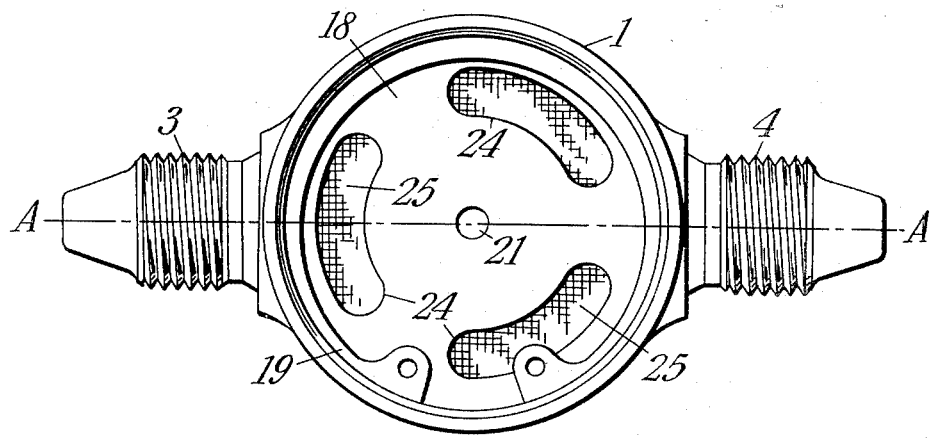
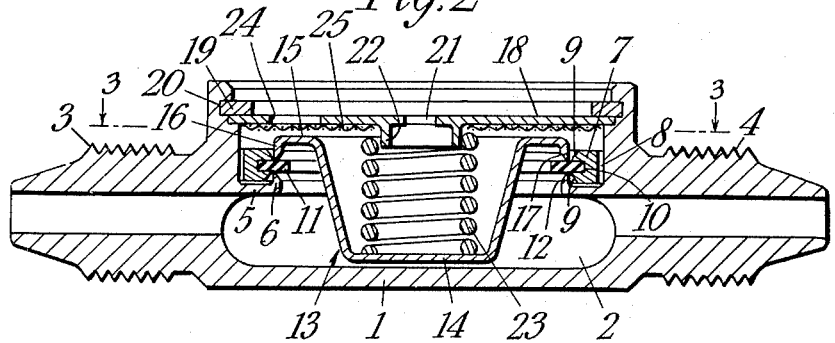
INVENTOR
Henry William Trevaskis
by Benj. T. Rauber
his attorney

2,752,942

PRESSURE RELIEF VALVE

Henry William Trevaskis, Solihull, England, assignor to Dunlop Rubber Company Limited, London, England, a British company Application September 13, 1952, Serial No. 309,509

Claims priority, application Great Britain September 18, 1951

2 Claims. (Cl. 137—512.1)

This invention relates to pressure relief valves, particularly pressure relief valves for pneumatic systems.

Pressure relief valves are frequently incorporated in pressure systems, both pneumatic and hydraulic, their function being to prevent the pressure in the system from exceeding a pre-determined value. They normally comprise a spring-loaded valve, which is adapted to blow when the pre-determined pressure in the system is exceeded.

The object of the present invention is to provide an improved pressure relief valve which is light in weight, compact and sensitive in operation and which is readily assembled and dismantled.

According to the present invention, a pressure relief valve comprises a housing containing a pressure chamber having inlet and outlet connections for pressure fluid and an exhaust for exhaust fluid, a seating ring within said pressure chamber, a fixed valve seat adapted to make a fluid tight seating on the pressure side of said ring, a movable valve having a valve seat adapted to make a fluid-tight seating on the opposite exhaust side of said ring, and spring means forcing said valve seats and ring together in fluid-tight engagement and adapted to deflect and allow said valve to blow on a pre-determined pressure in the system being exceeded.

Preferably the seating ring is located in an annular holder which is slidably fitted in a part of the pressure chamber and the spring means is fitted between the movable valve and a cover plate solid with the housing, said cover plate being perforated to permit the escape of pressure fluid when the valve "blows."

One embodiment of the invention is illustrated in the accompanying drawing wherein:

Figure 1 represents a plan view of a valve for a pneumatic system,

Figure 2 represents a sectional view taken on the line A—A of Figure 1, and

Figure 3:
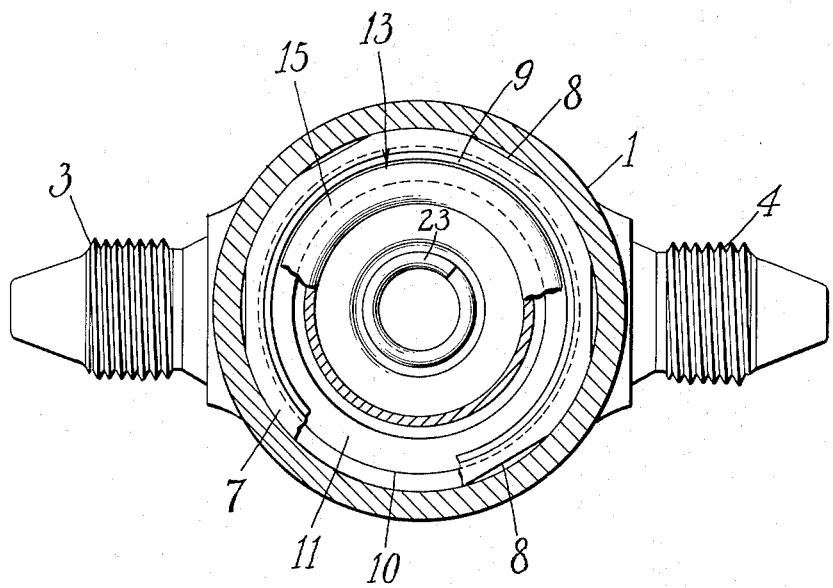
Figure 3 is a section of the valve taken on line 3—3 of Figure 2.

The valve comprises a housing 1 having a substantially cylindrical pressure chamber 2 formed therein, one end of the chamber being closed. The housing 1 is provided with two diametrically opposed screw threaded nozzles 3 and 4 which communicate with the side of the chamber 2. One of the nozzles 3 or 4 is intended to be connected to the upstream side of the pneumatic system and the other nozzle is intended to be connected to the downstream side of the system.

An annular ledge 5 extends radially inwardly from the side of the chamber 2 intermediate its ends and the end of said ledge 5 is provided with an annular lip 6 which extends a short distance towards the open end of the chamber 2, the end of said lip 6 being provided with an annular knife-edge portion 12. An annular seating holder 7 is slidably fitted in the chamber 2 between the ledge 5 and the open end of the chamber, the outer periphery of the holder being provided with a plurality of flats 8 of equal length. The inner peripheral edges 9 of the holder are chamfered and between the chamfered portions the inner periphery of the holder is provided with a radially-extending annular slot 10 of rectangular section. The outer peripheral edge of a rubber seating ring 11 is fitted in said slot 10, the inner peripheral edge projecting therefrom. The seating ring 11 seats on the annular knife-edge 12 associated with the annular ledge 5, hereinabove described.

A thimble-type valve 13 is fitted within the chamber 2. The base 14, or closed end of the thimble, is spaced a short distance away from the closed end of the chamber. The side of the thimble valve 13 tapers outwardly away from the base 14 and projects above the seating ring 11. The open end of the thimble valve is provided with an annular outwardly-extending portion 15 from the outer periphery of which an annular lip 16 extends axially and downwardly towards the seating ring 11. The end of the lip 16 is provided with an annular knife-edge portion 17 which seats on the exhaust side of the seating ring 11 remote from the annular ledge 5. The seating ring is thus nipped between the two annular knife-edge portions 12 and 17.

The open end of the chamber 2 is of larger diameter than the intermediate portion in which the holder 7 is slidably fitted, and a circular closure plate 18 is located against the shoulder so formed and is held thereon by a circlip or snap ring 19 fitting in a groove 20 in said larger diameter part. The plate 18 is located a short distance away from the open end of the thimble valve 13 when the valve is seated. The centre of the closure plate 18 is provided with a lipped hole 21, the lip 22 thereof extending axially towards the closed end of the valve 13. A helical compression spring 23 is fitted over said lip 22 and between the plate 18 and the closed end of the valve 13. The closure plate 18 is provided with a plurality of equispaced slots 24 of equal size and similar shape lying on a common pitch circle adjacent the outer periphery thereof but clear of the circlip 19 and an annulus 25 of gauze is secured to the plate 18 to cover the slots 24 and prevent the entry of foreign matter and the like.

The operation of the relief valve is as follows when connected into a pneumatic system. The spring 23, which is of pre-determined rating, exerts a known load on the valve 13 to maintain the two annular knife-edges 12 and 17 in sealing engagement with the seating ring 11. When the pressure in the system exceeds a pre-determined value it will deflect the spring 23 sufficiently to "crack" the valve and allow the escape of pneumatic pressure therethrough and thence through the slots 24 in the closure plate 18 to exhaust. Air under pressure may flow between the seating ring 11 and the annular seat 17 of the valve 13 and thence through the closure plate 18, or it may flow between the seating ring 11 and the annular seat 12 of the ledge 5, and then between the flats 8 of the seating holder 7 before flowing through the closure plate. Alternatively it may escape on both sides of the seating ring 11. The operation of the valve is very rapid, i. e. it will pass a considerable volume of air in a short period of time. The valve is very sensitive in operation, is light and is readily assembled and dismantled.

The relief valve may be modified to make it suitable for use in a hydraulic system by removing the gauze filter and providing means for connecting the exhaust side of the valve to a hydraulic reservoir.

Having described my invention—what I claim is:

1. A pressure relief valve for a fluid line which comprises a housing open at one side and having an inlet and an outlet to permit free flow of fluid from said inlet through said housing to said outlet, the open side of said housing having an annular valve seat facing outwardly and having a beveled annular flange, an annular ring on said valve seat supported by said beveled annular flange and movable outwardly therefrom, a valve having a beveled annular flange opposite the beveled annular flange of said valve seat and seating on the outer face of said ring and having a central part depressed into said housing and spaced from the inner peripheries of said valve seat and ring, a spring supporting member mounted in the opening of said housing outwardly of said valve and a spring confined between said spring supporting member and the depressed central part of said valve.

2. A pressure relief valve comprising a housing containing a pressure chamber of circular cross-section having an inlet, and outlet, and an exhaust opening for pressure fluid, an annular, axially displaceable, seating ring within said chamber, a fixed valve seat forming a ledge about said exhaust opening adapted to make a fluid-tight seating on the pressure side of said ring, a movable valve having an annular valve seat adapted to make a fluid-tight seating on the opposite or exhaust side of said ring and a thimble within and integral with said annular valve seat and projecting within and spaced from said ring toward the interior of said chamber, a helical compression spring acting on said thimble part of said valve to force said valve seats and ring together in fluid-tight engagement and to yield to allow said valve to blow on a predetermined pressure in the chamber and an annular seating holder having an annular groove in its inner periphery in which the outer periphery of the annular seating ring is received and held, said seating holder being slidable axially within a portion of the pressure chamber located between the annular ledge and the open end of said chamber.

References Cited in the file of this patent

UNITED STATES PATENTS

| | | |
|---|---|---|
| 147,292 | Steele | Feb. 10, 1874 |
| 1,356,298 | McGregor | Oct. 19, 1920 |
| 1,604,487 | Scovel | Oct. 26, 1926 |
| 2,247,520 | Paxton | July 1, 1941 |
| 2,349,137 | Brown | May 16, 1944 |
| 2,449,683 | Akerman | Sept. 21, 1948 |
| 2,603,452 | Spinney | July 15, 1952 |

FOREIGN PATENTS

| | | |
|---|---|---|
| 4,975 | Great Britain | 1879 |
| 215,865 | Great Britain | May 22, 1924 |